UNITED STATES PATENT OFFICE.

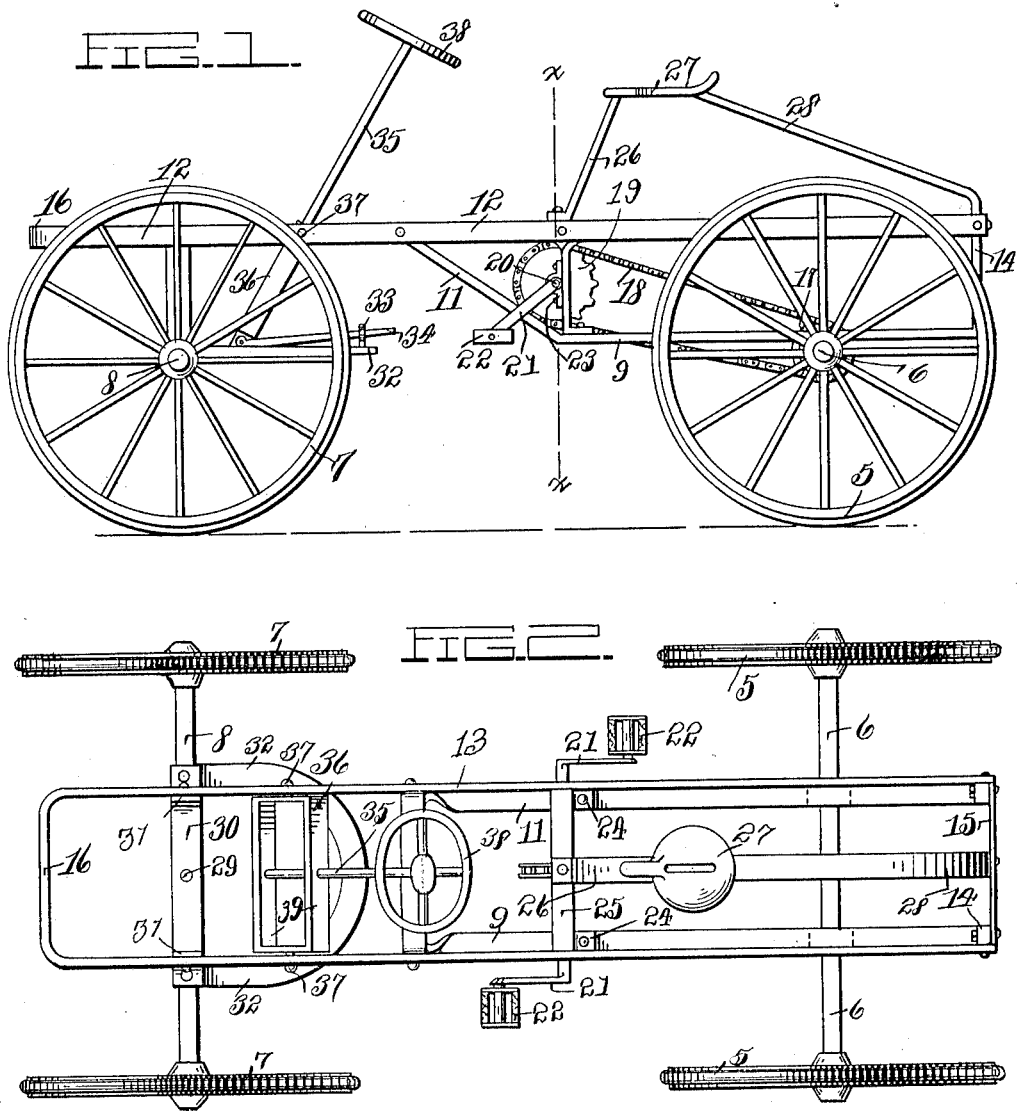

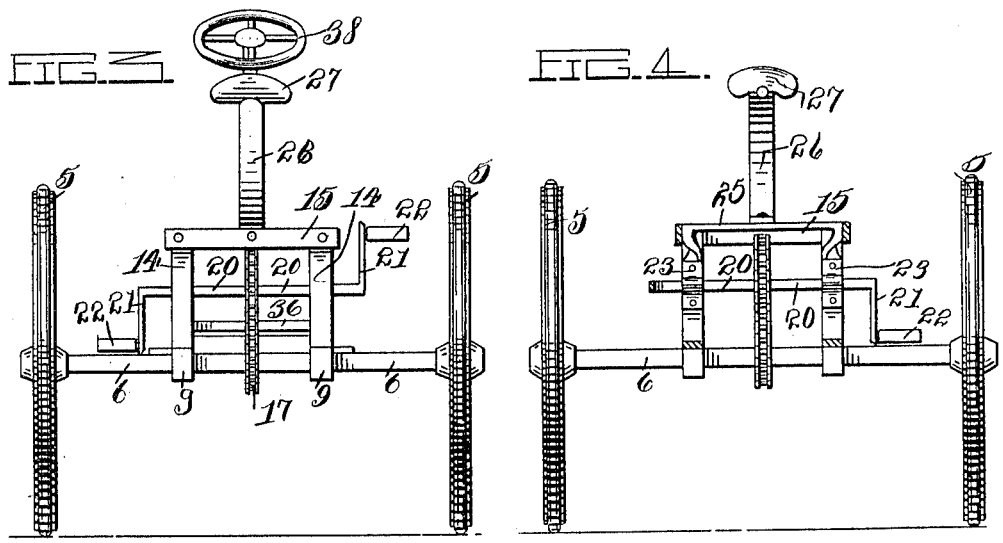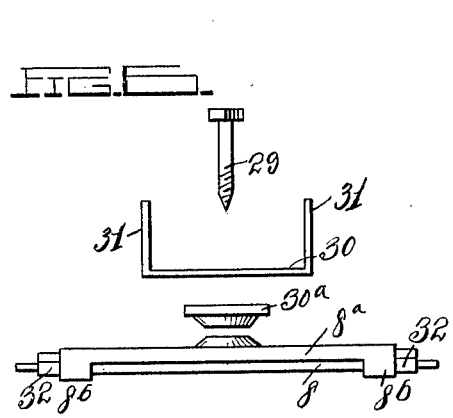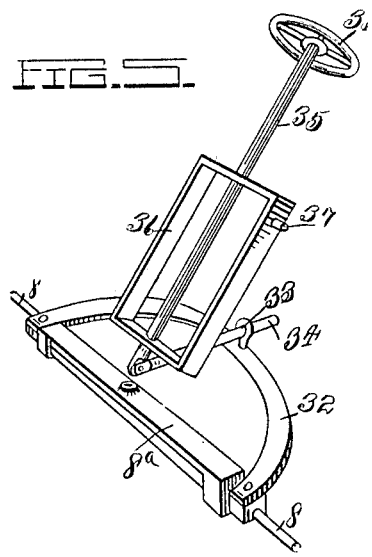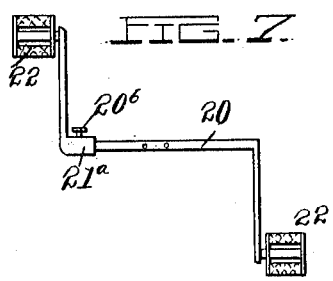

JESSE E. CRESS, OF LITCHFIELD, ILLINOIS.

PROPELLING MECHANISM FOR VEHICLES.

1,072,093.  Specification of Letters Patent. Patented Sept. 2, 1913.

Application filed October 4, 1910. Serial No. 585,266.

*To all whom it may concern:*

Be it known that I, JESSE E. CRESS, a citizen of the United States, residing at Litchfield, in the county of Montgomery, State of Illinois, have invented certain new and useful Improvements in Propelling Mechanism for Vehicles; and I do hereby declare the following to be a full, clear, and exact description of the invention, such as will enable others skilled in the art to which it appertains to make and use the same.

This invention relates to improvements in manually propelled vehicles, and is especially applicable for use by juveniles, and the leading object in view is to provide a vehicle of this class having a frame consisting of but few parts well braced together, to form a rigid structure; the same being simple of construction and relatively inexpensive.

With the above and other objects in view the invention consists in certain constructions, combinations and arrangements of parts, clearly described in the following specification and clearly illustrated in the accompanying drawings, in which—

Figure 1 is a side elevation. Fig. 2 is a top plan view. Fig. 3 is a rear end view. Fig. 4 is a transverse sectional view taken on the line *x—x* of Fig. 1, with the seat post and drive parts in elevation. Fig. 5 is a detail perspective view of the steering mechanism. Fig. 6 is a collective view showing the bearing members of the front axle. Fig. 7 is a detail plan view of the sectional crank.

Referring to the accompanying drawings illustrating the preferred embodiment of the invention 5 denotes the rear wheels which are mounted on the rear axle 6 and 7 denotes the forward wheels which are mounted on the front axle 8. The rear axle 6 is mounted on the longitudinally extending frame bars 9 and 10 which are spaced apart from each other and the forward ends of which are inclined at 11 and which connect to the horizontal top frame bars 12 and 13 which extend longitudinally above the bars 9 and 10 and are of considerably greater length than said bars 9 and 10. The rear ends of the bars 9 and 10 are extended above said bars to form vertical braces 14 which are connected to the rear cross piece 15 in a rigid manner. The bars 12 and 13 form the sides of a U-shaped frame section the central portion of which forms a forward cross bar 16 and the terminals of which are rigidly connected to the rear cross bar 15 and the vertical braces 14.

The rear axle 6 is provided with a sprocket wheel 17 over which a drive chain 18 operates, the forward portion of the chain 18 being passed over a drive sprocket 19 mounted on the shaft 20 having crank ends 21, which carry conventional pedals 22. The shaft 20 is journaled in bearings 23 which are mounted on the vertical braces 24 the lower ends of which braces are mounted on the frame bars 9 and 10 and the upper ends of which bars or braces are twisted and connect with the transversely extending bar or brace 25. The bar or brace 25 has secured thereto a seat post 26 which carries a saddle seat 27 and which is effectively braced by means of an angular brace rod 28 which extends downwardly and rearwardly and which connects with the rear cross bar 15. The seat post 26 and the brace 28 form a resilient support for the seat 27. The cranks 21 extend on opposite sides of the frame bars 12 and 13, which bars are arranged close enough together to provide for a comfortable movement of the feet of an operator seated on the seat 27.

The front axle 8 is pivotally secured at a central point by a bolt 29 which passes through a bar 30 mounted on the lower ends of the hangers 31, the upper ends of which are mounted on the frame bars 12 and 13. The axle 8 carries a bearing or wear plate 8ª which is formed with offset portions 8ᵇ wrapped around said axle 8. A circle or curved bearing member 32 is secured at its ends to the axle 8 and said member carries a bearing eye 33 secured to its central portion. The bearing eye 33 receives a sliding steering arm or rod 34 which is bifurcated at its forward end and which bifurcated end receives the lower end of the steering rod or shaft 35 and which lower end is pivoted to said bifurcated end. The shaft 35 is mounted on a rectangular bearing frame 36 which is pivoted at 37 to the frame bars 12 and 13 and on the upper end of said shaft a steering wheel 38 is rigidly secured. The frame 36 is provided with upper and lower cross bars 39 through which the steering rod or shaft 35 passes. By turning the wheel 38 the rod 34 will be swung in a horizontal plane and the front wheels will be steered in the direction corresponding to the direction of movement of the rod 34. Should it be desired to throw the steering rod 35 forwardly this can be done by forcing the same forwardly, as the pivots 37 permit of the necessary forward movement and the rod 34 by sliding on the bearing eye 33 allows this movement.

The shaft 20 is preferably formed in sections, one of the sections being formed with a socket 21$^a$ and the end of the other section fitting into said socket and being secured by a screw 20$^b$. It will be noted that the main parts of the frame consist of two U-shaped sections which are rigidly connected to each other and are spaced apart to provide for the support of the seat and the propelling means of the vehicle. The frame parts are all made out of bar iron or steel or other metal and do not require any special dies for their manufacture other than the ordinary cutting dies.

What is claimed is:—

1. A motor vehicle embodying an upper frame, a lower frame disposed in parallel relation beneath the rear part of the upper frame and having its forward portion connected to the upper frame intermediate of the ends of the latter, cross braces at the rear end of the upper frame and at a substantial central point thereof, a seat post arch connecting said braces centrally of the frame and inclined downwardly at its rear portion, a seat mounted on said post, vertical braces between the frames intermediate the ends of the upper frame, wheeled axles supporting the forward and rear ends of the frames, steering means for the forward axle and drive means supported by the vertical braces for driving the rear axle.

2. A motor vehicle embodying an upper frame of U-form having its bight portion forwardly disposed, a wheeled axle pivoted below the forward portion of the upper frame, means for steering said axle, a lower frame beneath the rear portion of the upper frame and having a forward bight portion directed upwardly at an angle and connected to the sides of the upper frame to form a brace intermediate the ends of the latter, the rear ends of the lower frame being bent upwardly at right angles, a cross brace connecting said upwardly bent portions and the rear extremities of the upper frame, braces connecting the side portions of the upper and lower frames near the upwardly directed portions and having an intermediate portion connected to the sides of the upper frame to form a brace therefor, bearings carried by said braces, a foot operated crank shaft rotatable in the bearings and operable beyond the sides of the frame and gear connections between the axle and the crank shaft.

In testimony whereof, I affix my signature, in presence of two witnesses.

JESSE E. CRESS.

Witnesses:
 GEORGE W. GRIFFITH,
 GLEN McDONALD.

---

Copies of this patent may be obtained for five cents each, by addressing the "Commissioner of Patents, Washington, D. C."